United States Patent
Huang et al.

(10) Patent No.: US 7,716,834 B2
(45) Date of Patent: May 18, 2010

(54) SCREEN MANUFACTURING METHOD AND WELDING APPARATUS THEREOF

(75) Inventors: Chunhong Huang, Beijing (CN); Jichu Chen, Beijing (CN)

(73) Assignee: Beijing Hinen-Hitech Petroleum Technology Development Co., Ltd, Beijing (CN)

( * ) Notice: Subject to any disclaimer, the term of this patent is extended or adjusted under 35 U.S.C. 154(b) by 1056 days.

(21) Appl. No.: 11/362,282

(22) Filed: Feb. 27, 2006

(65) Prior Publication Data
US 2007/0204465 A1     Sep. 6, 2007

(51) Int. Cl.
*B23P 11/00* (2006.01)
*B23P 15/16* (2006.01)
*E03B 3/18* (2006.01)
*B23K 1/14* (2006.01)
*B23K 37/00* (2006.01)
*B23K 37/04* (2006.01)

(52) U.S. Cl. ............... 29/896.62; 29/896.6; 29/517; 166/227; 166/230; 166/232; 166/233; 228/44.3; 228/48; 228/49.2

(58) Field of Classification Search ............... 29/517, 29/525.14, 896.6, 896.61, DIG. 38, 896.62; 166/227, 230, 232, 233, 380; 228/44.3, 44.5, 228/48, 49.2, 136, 173.2
See application file for complete search history.

(56) References Cited

U.S. PATENT DOCUMENTS

| | | | | |
|---|---|---|---|---|
| 1,715,856 A * | 6/1929 | McEvoy, Jr. | ................. | 166/233 |
| 3,033,783 A * | 5/1962 | Lubben | ...................... | 228/136 |
| 5,624,560 A * | 4/1997 | Voll et al. | ..................... | 210/486 |
| 6,949,728 B2 * | 9/2005 | Toyooka et al. | ............ | 219/613 |
| 2006/0137883 A1 * | 6/2006 | Kluger et al. | ............... | 166/380 |
| 2006/0157256 A1 * | 7/2006 | Hopkins et al. | ............. | 166/380 |

* cited by examiner

*Primary Examiner*—David P Bryant
*Assistant Examiner*—Alexander P Taousakis
(74) *Attorney, Agent, or Firm*—J.C. Patents

(57) ABSTRACT

The present invention relates to a method for manufacturing a screen and welding apparatus thereof, putting a metal filter net around the outside of a support sheath and fixing the metal filter net to the outside of the support sheath by way of welding, such that the metal filter net completely covers all filter holes of the support sheath to form a filter sheath with; fixing the filter sheath to the outside of the base pipe and the filter sheath completely covering all penetrated holes on the base pipe; putting a jacket around the outside of the filter sheath and fixing it to the outside of the base pipe such that the jacket completely covers the outside surface of the filter area of the filter sheath. The present invention uses direct spot welding and seam welding technology to fix the metal net to the outside of the support sheath directly, eliminates leakage hole phenomena appearing on jointing parts of the metal net and forms the screen with multi-layer metal nets with improved sand control capability and life time. The present invention also discloses the apparatus for above-said screen to realize penetrated welding of the filter sheath so as to improve the welding quality of the metal net and lower the factory cost of the screen.

26 Claims, 4 Drawing Sheets

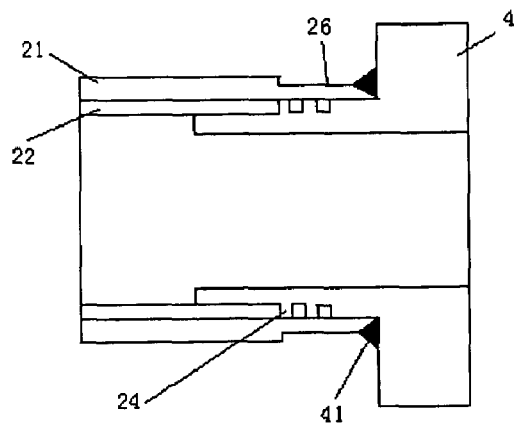
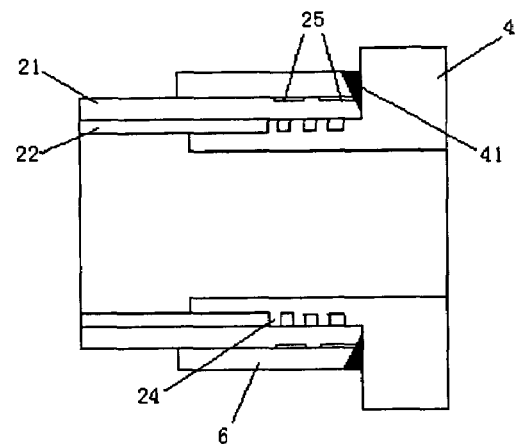
Fig. 7    Fig. 8
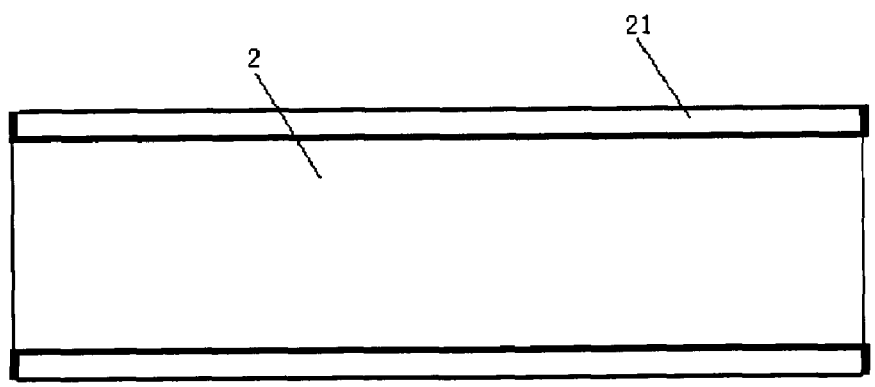
Fig. 9

SCREEN MANUFACTURING METHOD AND WELDING APPARATUS THEREOF

FIELD OF THE INVENTION

The present invention relates to a method for manufacturing screen (or sieve tube) and welding apparatus thereof, particularly to a method for manufacturing screen made of filtering material including metal net by resistance spot welding or seam welding technology and welding apparatus thereof. It belongs to petroleum exploitation field.

BACKGROUND OF THE INVENTION

In petroleum and natural gas exploitation fields, in order to prevent sand in the oil-gas well from being brought to shaft or ground apparatuses together with oil-gas-water while sanding, in-well screen which could effectively filtrates oil-gas-water needed to be used. One hole in a segment of an in-well screen ranged from several decades to several hundred meters would destroy the whole sand protection in-well project. If the sand protection fails, normal production of the oil-gas well will be influenced or the oil-gas well will be discarded. Thus filter materials of screen thus need to possess the following comprehensive property: exactly controllable pore size, strong whole strength, flexibility, excellent corrosive resistance and high reliability.

At present, most of filter materials used to make premium screen are very expensive multi-layer sintered metal net. This multi-layer sintered metal net is porous filter material produced by vacuum welding technology. It is a composite made of multilayer metal net, metal fiber or metal powder and has better solderability. It can be welded by arc welding or plasma arc welding without leaks and guarantee the welding strength. However, the filter material has high factory cost, low productivity and its size is limited by vacuum welding apparatus.

Using metal net to take place of above-said sintered filter material will have high economic benefit. However, conventional welding technology has either low welding strength or leak phenomena (shrinkage hole phenomena) appears on welding parts of melt net. When using single-layer metal net as filter material of screen, welding pores will appear on arc welding parts. Therefore, single-layer metal net is fixed on base pipe of screen by way of mechanical fixing means (e.g. hem and compacting means etc). However, the strength and reliability produced by these methods are relative low.

Although the screen may be made of non-sintered multi-layer composite net, during welding, shrinkage hole phenomena of multi-layer compound net is more serious than single-layer metal net. At the same time, due to high thickness of screen and several-meter-long filter segment, series of difficulties are brought to welding procedure. Thus how to obtain high quality and low cost screen welded by way of welding method from metal net is one big problem in the field.

SUMMARY OF THE INVENTION

One object of the present invention is to provide a method for screen manufacturing and welding apparatus thereof, which uses resistance spot welding or seam welding technology to directly combine metal nets and connect them to base pipe etc, so as to eliminate leakage hole phenomena occurring at welding part of metal net, and form a screen from multi-layer metal net with improved sand control capacity and life time.

Second object of the present invention is to provide a method for screen manufacturing and welding apparatus thereof to improve welding quality of metal net and lower factory cost of screen by way of two-side one-point welding.

The method for manufacturing the screen provided by the present invention is achieved as follows: said screen at least comprise a base pipe with multiple penetrated holes on pipe wall, a filter sheath and a protection jacket with multiple leakage holes in pipe wall; wherein the filter sheath is placed on and covers the outside of the base pipe, and the jacket is placed on and covers the outside of filter sheath, and the welding method is as follows:

Step 10 wrapping the outside wall of a support sheath with a metal filter net and fixing the metal filter net to the outside of the support sheath by way of welding, such that the metal filter net completely covers all penetrated holes of the support sheath to form the filter sheath;

Step 11 fixing said filter sheath to the outside wall of the base pipe and the filter sheath completely covering all penetrated holes of the base pipe;

Step 12 putting said jacket round the outside of the filter sheath and fixing it to the outside of the base pipe, such that said jacket completely covers the outside surface of filter potion of the filter sheath.

The present invention also provides another screen manufacturing method, which comprises:

Step 20 rolling a metal filter net into cylinder and welding the metal filter net which is rolled into cylinder by way of welding to form the filter sheath;

Step 21 fixing the filter sheath to the base pipe such that it completely covers all penetrated holes on the base pipe;

Step 22 putting the jacket round the outside of the filter sheath, fixing it to the filter sheath such that the jacket completely covering the outside surfaces of the filter portion of the filter sheath. Also the present invention provides a welding apparatus for the screen, comprising: an electric welding machine and a screen drive unit. The electric welding machine at least comprises a basal body, an arm, an inner welding head and an outer welding head; the outer welding head is mounted on the basal body and can be driven to move up and down by outer welding head drive unit, the inner welding head is mounted on the arm corresponding to the outer welding head and when the outer welding head is moved in the direction to inner welding head, they press the filter sheath of the screen at the same position from their own sides respectively. The inner welding head and outer welding head are connected with welding power supply for supplying welding current to the part of the filter sheath of the screen to be welded. Al least a holder and a shifting unit are set on the screen drive unit. The holder thereof is used for clamping the filter sheath of the screen, and the shifting unit is used for moving the filter sheath of the screen along the welding direction.

The present invention utilizes resistance spot welding or seam welding technology to directly combine metal net. Actually the combination is to fix multilayer of metal net together and connect it with the base pipe etc, so as to eliminate leakage hole phenomena appeared on jointing parts of the metal net and form the screen with multilayer metal nets and improve sand-control and life time. In addition, the present invention uses direct welding method to improve the welding quality of the metal net and lower the factory cost of the screen.

BRIEF DESCRIPTION OF THE DRAWINGS

FIG. 7 is second schematic drawing of welding the filter sheath's end of the present invention.

FIG. 8 is third schematic drawing of welding the filter sheath's end of the present invention.

FIG. 9 is a schematic drawing of another filter sheath of the present invention.

DETAILED DESCRIPTION OF THE PREFERRED EMBODIMENTS

The solution provided by the present invention will be better understood from following detailed description of preferred embodiments of the invention with reference to the drawings.

Figure 1:
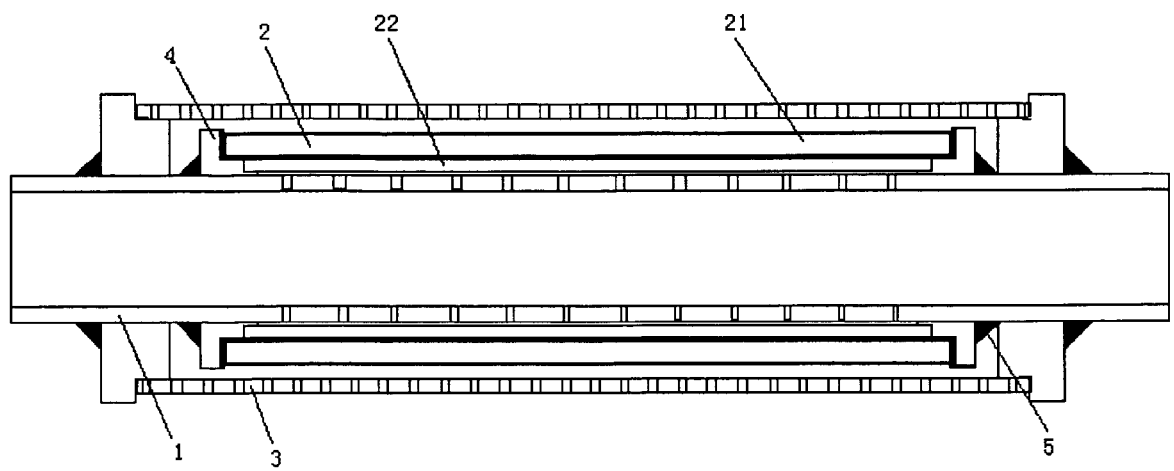
FIG. 1 is a structure schematic drawing of the screen of the present invention.

As shown in FIG. 1, it shows the screen manufactured by the present invention, which comprises a base pipe 1 with multiple penetrated holes in pipe wall, a filter sheath 2 and a protection jacket 3 with multiple leakage holes in pipe wall; wherein the filter sheath 2 covers the outside of the base pipe 2 and the jacket 3 covers the outside of filter sheath 2. And the detailed welding method is:

Step 1 wrapping the outside of a support sheath 22 with a metal filter net 21 and fixing the metal filter net 21 to the outside of the support sheath 22 by way of welding, so that the metal filter net 21 completely covers all filter holes of the support sheath 22 to form the filter sheath 2;

Step 2 fixing the filter sheath 2 to outside of the base pipe 1 such that the filter sheath 2 completely covers all penetrated holes of the base pipe 1;

Step 3 putting the jacket 3 around the outside of the filter sheath 2 and fixing it to the outside of the base pipe 1, such that the jacket 3 completely covers outside surface of filter area of the filter sheath 2.

Wherein above-presented metal filter net 21 is divided into filter net and diffusion net. The filter net has the function of filtration, whose mesh size determines filter precision. Generally, it is twill weave or plain weave and made of stainless steel. The diffusion net has the function of diffusing liquid and lowering liquid flow resistance, the mesh size of which is larger than that of the filter net. Generally the diffusion net is square-mesh net with mesh number 10-30, and fiber diameter is 2-5 times of filter precision. Lap-joint surplus of the filter net is 5-40 mm.

Figure 2:
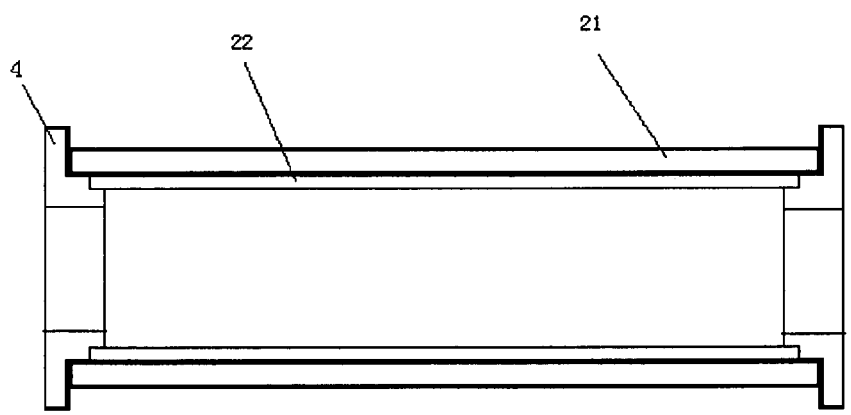
FIG. 2 is a structure schematic drawing of the filter sheath of the present invention.

The most critical procedure during the process of welding the screen is to weld the filter sheath 2, detailed description is as follows: As illustrated in FIG. 2, firstly, welding the metal filter net 21 to form the filter sheath 2, the detailed welding method thereof is as follows: a stainless steel tube is utilized as the support sheath 22, of which a plurality of filter holes are opened. Rolling the metal filter net 21 around the outside wall of the support sheath 22 with multiple penetrated holes, such that the metal filter net 21 completely covers all filter holes of the support sheath 22. When rolling, start end of the metal filter net 21 is fixed to the outside wall of the support sheath 22 by spot welding and then the support sheath 22 is rotated in one direction, making the metal filter net 21 to cover the outside wall of the support sheath 22. Furthermore, in order to guarantee the quality of rolling step, when one segment of the metal filter net 21 is rolled, the rolled segments are welded to a whole to fix by spot welding.

Above-said rolling step can use relative rotation and friction on the friction surface by the gravity of the support sheath 22 to directly roll the metal filter net 21 around the support sheath. The detailed rolling method is as follows: flat the metal filter net 21 on an arc friction surface suited with the edge radian of the support sheath 22 and fix the start end of the metal filter net 21 to the support sheath by way of energy-storing spot welding or resistance spot welding. Use an rotation mechanism to drive the support sheath 22 to rotate in one direction so that the metal filter net 21 is plainly rolled on the support sheath 22 till the metal filter net 21 rolled on the support sheath 22 meets the design requirement. After the metal filter net 21 is tightly rolled, it is fixed to the support sheath by way of energy-storing spot welding or resistance spot welding. In order to improve the contact between the metal filter net 21 and the support sheath 22, above-said friction surface can be an elastic surface. The friction surface comprises wearable surface, elastic body and support body. The friction surface is made from metal net to improve its abrasion resistance.

Figure 3:
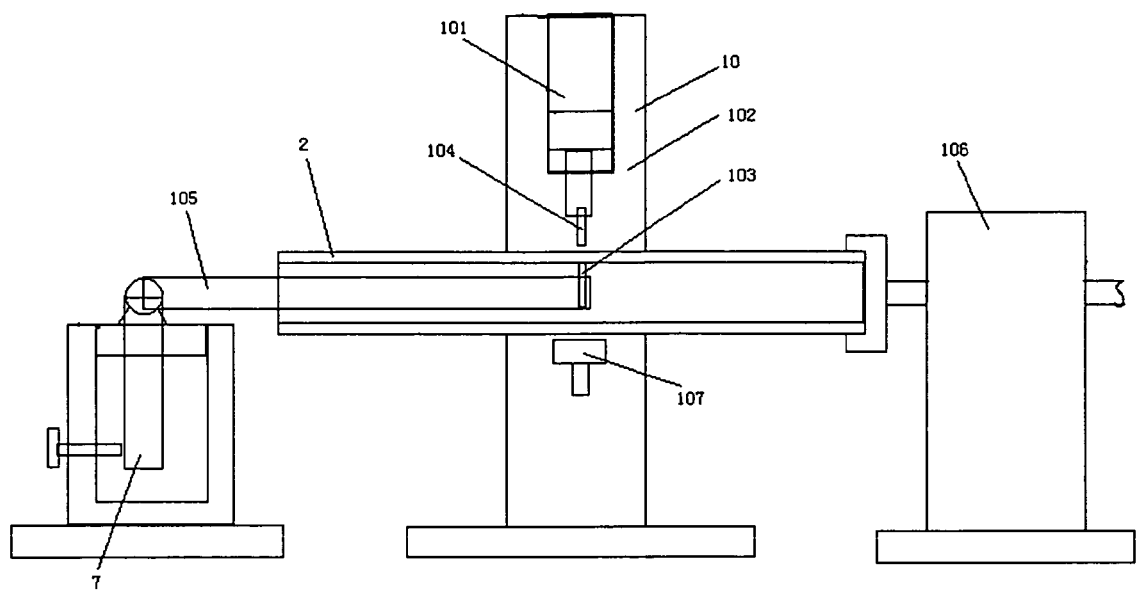
FIG. 3 is a schematic drawing of welding apparatus for longitudinal seam welding of the filter sheath of the present invention.

As shown in FIG. 3, after rolling the filter sheath 2, the longitudinal seam of the metal filter net 21 on the filter sheath 2 needs to be well welded. The detailed welding method is as follows: putting the filter sheath 2 around the welding apparatus 10, which comprises of outer welding head drive device 101 and welding machine 102 etc. The welding machine 102 of the welding apparatus 10 is consisted of a welding power supply, an inner welding head 103, an outer welding head 104 and an arm 105. The inner welding head 103 is fixed on the arm 105; the inner welding head 103 and outer welding head 104 is one-to-one correspondence.

When welding, put the filter sheath around the arm 105 of welding apparatus 10 so that the inner welding head 103 can press the filter sheath from inside. The outer welding head 104 and the inner welding head 103 is driven to move toward each other, so that the outer welding head 104 presses the metal filter net welded on the outside wall of the filter sheath 2. Thus the support sheath 22 and the metal filter net 21 shown in FIG. 2 are tightly pressed against each other on the weld point by the outer welding head 104 and the inner welding head 103. The pressure is controlled in the range of 0.17-170 kgf/mm2, preferable about 17 kgf/mm$^2$.

After tightly pressing the support sheath 22 and the metal filter net 21 at the welding point, the outer welding head 104 and the inner welding head 103 are supplied with welding current so that parts of the support sheath 22 and the metal filter net 21 which conduct the welding current are welded in a whole. The duration of the welding current is no more than 0.3 s;

After stopping supplying welding current, the outer welding head drive mechanism 101 of the welding apparatus 10 separates the inner welding head 103 and the outer welding head 104 from the filter sheath 2. The stepping drive mechanism 106 drives the filter sheath 2 to move along its axial direction, so that the inner welding head 103 and the outer welding head 104 correspond to an un-welded position, then above-said welding procedure is repeated till the metal filter net 21, which covers the outside of the support sheath 22, finishes the whole welding along the axial direction of filter sheath 2. When driving the filter sheath to move, each time the distance the filter sheath 2 moved should be no more than the size of weld point, so that all welded points are joined together to form the dense seams to guarantee welding quality.

In order to prevent oxidation caused by heat, when welding, water-cooling is used to rapidly lower the temperature. In addition, a circulation cooling system is placed in the arm to solve heat problem caused by high current continuous welding and bad ventilation condition of the cable.

Figure 4:
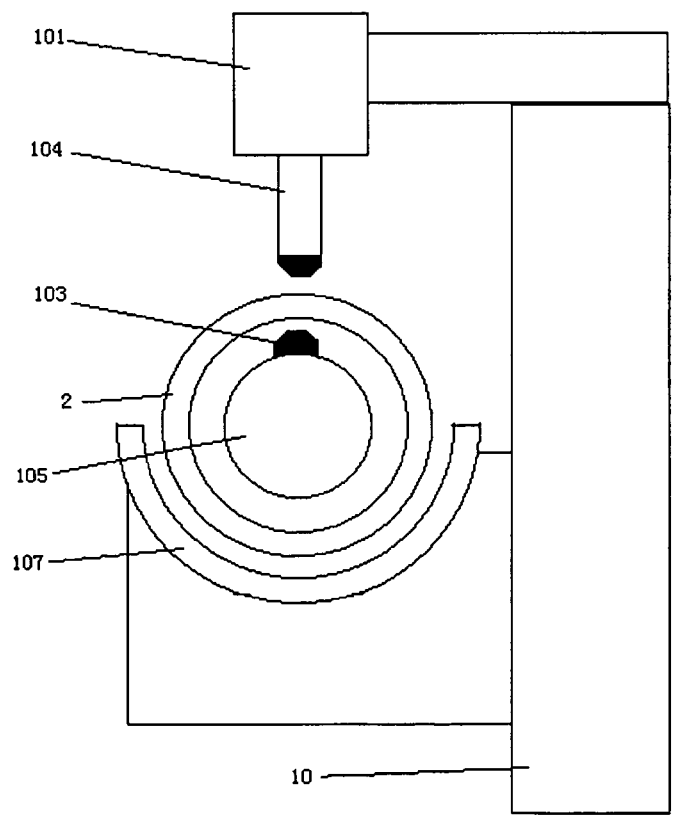
FIG. 4 is a schematic drawing of position limitation supporter at the welding end of the arm of the present invention.

As shown in FIG. 4, since the filter sheath 2 has a certain length, the position limitation supporter 107 may be provided behind weld points of the arm 105. When the outer welding head 104 tightly presses the filter sheath 2 toward the inner welding head 103, the position limitation supporter 107 is utilized to support the outside wall of the filter sheath 2, then further support the arm 105 so that the arm 105 will not be significantly deformed and thus the displacement will not appear between the inner welding head 103 located on the arm 105 and the outer welding head 104. In addition, the position limitation supporter 107 may be V shape, U shape or other shapes which can prevent the filter sheath 2 from swinging and match with the edge of the filter sheath 2.

Actually, above-said welding method may also use the pattern other than the pattern that the inner welding head 103 and the outer welding head 104 presses the filter sheath 2 from two sides. Alternatively, it is to use two welding heads to tightly press the outside wall of filter sheath 2 and then supply the instant welding current. This welding pattern may not use the above-said arm 105; however the welding quality is worse than the pattern that the inner welding head 103 and the outer welding head 104 press the filter sheath from two sides. In addition, when using the pattern that the inner welding head 103 and the outer welding head 104 press the filter sheath from two sides, the inner welding head 103 and the outer welding head 104 may use weld wheels to implement seam welding for the weld points.

When using above welding pattern that the inner welding head 103 and the outer welding head 104 press the filter sheath from two sides, the arm 105 may use non-magnetic metal so that the arm 105 can not only conduct current but also stabilify the welding current. The problem of serious heat of the filter sheath 2 and arm 105 can also be avoided.

When welding one weld point is finished, the pressure acted on the filter sheath 2 by the gravity of the arm 105 may not be eliminated. Hereby the motion resistance of the filter sheath 2 will be very heavy, thus the filter sheath 2 can't move. If the filter sheath 2 is strongly pushed, it will be scuffed or pushed uniformly. Therefore, it is appreciated that the arm 105 has upward force so that the motion of the filter sheath 2 will not be influenced.

Figure 5:
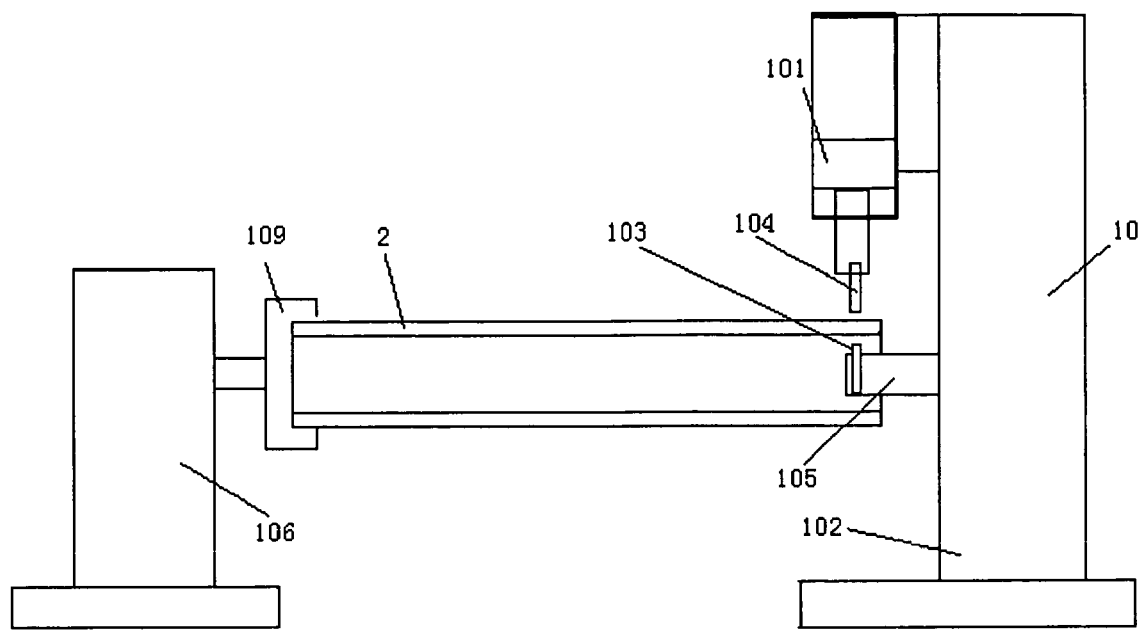
FIG. 5 is a schematic drawing of welding apparatus for circular seam welding of the filter sheath's ends of the present invention.

As shown in FIG. 5, after the longitudinal seam is well welded, circular seam of two ends of the filter sheath 2 is also needed to be welded, the concrete welding pattern is still spot welding, and the procedure of welding is as follows:

At first, the filter sheath 2 is set on the welding apparatus 10 which comprises the outer welding head drive mechanism 101, the welding machine 102 etc; wherein the welding machine 102 of the welding apparatus 10 is consisted of welding power supply, the inner welding head 103 and the outer welding head 104. The inner welding head 103 is mounted on the internal arm and is one-to-one corresponding to the outer welding head 104. The holder 109 for holding the filter sheath is placed on the stepping drive mechanism 106, and is driven to rotate by the stepping drive mechanism 106.

When welding, the inner welding head 103 inside the filter sheath 2 and the outer welding head 104 outside the filter sheath 2 press against each other at the same end of the filter sheath 2, so that the support sheath 22 and the metal filter net 21 shown in FIG. 2 are tightly pressed at weld point. The pressure is controlled in the range of 1.17-170 kgf/mm2, preferably about 17 kgf/mm$^2$.

The inner welding head 103 and the outer welding head 104 are supplied with welding current no more than 0.3 s so that the support sheath 22 and the metal filter net 21 are arc welded in a whole at weld points. After stopping supplying welding current, the outer drive mechanism 101 of the welding apparatus 10 separates the inner welding head 103 and the outer welding head 104 from the filter sheath 2 and rotates them along axis center of the filter sheath 2 to locate the inner welding head 103 and the outer welding head 104 to an un-welded position of the end. Above-said welding procedure is repeated till the metal filter net 21 which covers the support sheath 22 finishes the whole welding along circular outside of end of the filter sheath 2. When driving the filter sheath 2 to rotate, each time the distance that the filter sheath 2 rotated should be no more than the size of weld point, so that all welded points are joined together to form the dense welding seams to guarantee welding quality. In order to prevent the oxidation of weld points caused by heat, when welding, using water-cooling to rapidly lower the temperature around weld points.

Figure 6:
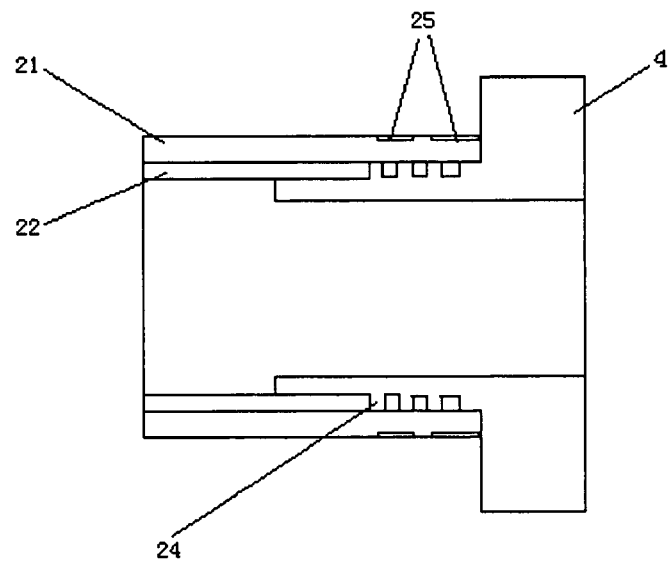
FIG. 6 is first schematic drawing of welding the filter sheath's end of the present invention.

As shown in FIG. 1 and FIG. 6, in order to intensify the welding current for improving welding strength, a plurality of protruding parts or grooves 24 may be set on the welding position of the end of the filter sheath 22, which can improve the sand control capacity and are convenient for machining operation and also can enlarge the welding current of weld points. In order to guarantee all weld points with enough welding strength, the size of every weld point ranges in 1-10 mm×1-10 mm, preferably no larger than 3 mm*4 mm.

In order to get more reliable quality in the case where the filter sheath 2 is engaged with the base pipe 1, when welding the filter sheath 2, the end of the metal filter net 21 is welded to a welding ring 4 for resistance welding. After one cycle of resistance welding is finished along the end of the metal filter net 21, implement arc welding so that the metal filter net 21 and welding end form melting welding line 25. In order to improve sand control reliability of the end, joint of the welding line 25 and the weld ring of the end uses electric arc welding to weld. The weld points by arc welding is also smooth, flat and convenient for checking as well as the problems of contraction of the metal filter net 21 and shrinkage hole caused by the arc welding will not appear.

When the filter sheath 2 and the base pipe 1 are to be fixed to each other, at first, the filter sheath is placed on and the base pipe 1 and covers all penetrated holes of the whole base pipe 1, and then the end of the filter sheath 2 and outside wall of base pipe 1 are welded in a whole by way of welding. When welding, electric arc welding method may be used. After fixing the filter sheath 2 to the base pipe 2, the jacket 3 with multiple penetrated holes is placed around the outside of the filter sheath 2 with the jacket 3 completely covering the filter sheath 2.

The filter sheath 2 is placed on the base pipe 1 and covers all penetrated holes on the whole base pipe 1, and then the end of the filter sheath 2 and outside wall of base pipe 1 are welded in a whole. In order to save factory cost and simplify manufacturing procedure, the support sheath 22 inside the filter sheath 2 is not adopted. Hereby the procedure of placing the filter sheath 2 on the base pipe 1 may skip, thus further reduce the manufacturing procedure, save materials and lower factory cost.

In order to lower destroy possibility when the filter sheath 2 is on the status of working in well, the jacket 3 is needed to be set outside of the filter sheath 2. The jacket may be made of stainless steel material by welding, e.g. the stainless steel pipe with multiple penetrated holes. The stainless pipe is place on and covers the outside of the filter sheath 2 and is fixed to the base pipe by way of electric arc welding to form the whole screen.

As shown in FIG. 7 and FIG. 8, in order to prevent leakage hole phenomena when welding the metal filter net 21 to the end welding ring 4, implementing spot welding and then implementing electric arc welding. Also in order to improve the welding quality of the electric arc welding, filler wire may be used to implement the final whole welding. The detailed procedure is initially fixing the welding wire to the part to be welded, and then melting it by way of electric arc welding so that the welding wire and the metal filter net 21 are engaged together, as well as the metal filter net 21 and the end welding ring 4 are engaged together. The welding wire filled in the part to be welded may use tabular wire or rectangular wire. Since the tabular wire or rectangular wire is difficult to roll, and possess better positioning property, thus it is convenient for positioning by the resistance welding.

As shown in FIG. 8, it also may use a hoop 6 to achieve connecting the metal filter net 21 with the end welding ring 4. That is, the hoop 6 is placed on and covers the end of the metal filter net 21 and the metal filter net 21 is placed on and covers the outside of the end welding ring 4, then the metal filter net 21 and the end welding ring 4 are fixed together by the hoop 6. Thus When using welding or part welding to connect, the welding strength is improved. In order that the end welding ring 4 can be well welded together with the filter sheath 2, welding material i.e. filler wire 41 may be filled in a welding circular seam 26 which is located at the connection ends of the end welding ring 4 and the filter sheath 2 in advance. When welding, the filler wire 41 is melted down by the welding current, so that the end welding ring 4 and the filter sheath 2 are melted in a whole to form circumferential weld points or welding ring. Another approach for the end welding ring 4 to be well welded with the filter sheath 2 in a whole is fixing the connection ends of the end welding ring and the filter sheath 24 by using the hoop 6. In order to get better connection quality, the filler wire 5 is filled between the hoop 6, the end welding ring 4, and the end welding ring 4, then the hoop 6 and the filter sheath 2 are welded in a whole by way of electric arc welding.

As shown in FIG. 9, in another case where the filter sheath 2 of the screen doesn't use the support sheath. As an alternative, rolling the metal filter net 21 in to cylinder to form the filter sheath 2, and detailed welding method is as following: the screen at least comprises base pipe 1, filter sheath 2 and jacket 3 with multiple holes. The filter sheath 2 is placed on and covers the outside of the base pipe 1 with all penetrated holes on the base pipe 1 completely covered. The jacket 3 covers the outside of the filter sheath 2 with the filter portion of the filter sheath 2 completely covered. The detailed welding procedure thereof is as following:

Rolling the metal filter net into cylinder and welding the metal filter net 21 which is rolled into cylinder along its axial direction to form the filter sheath 2 by way of welding. Then putting the jacket 3 around the outside of the filter sheath 2 and fixing it to the filter sheath 2 with the outside of filter part of the filter sheath 2 completely covered.

Concretely speaking, it is to weld one end of the metal filter net 21 which is rolled into cylinder along its axial direction by way of spot welding, and then weld the end of the metal filter net 21 which is rolled into cylinder to form the filter sheath 2.

As shown in FIG. 3, when welding the metal filter net 21 along the axial direction, at first, the inner welding head 103 inside the metal filter net 21 which is rolled into cylinder and the outer welding head 104 outside the metal filter net 21 which is rolled into cylinder press against each other, so that each layer of the metal filter net 21 is tightly pressed at the weld points. Supply instant welding current by the inner welding head 103 and the outer welding head 104, parts of each layer of the metal filter net 21 which conduct the welding current are welded in a whole by way of electric arc welding. Further separate the inner welding head 103 and the outer welding head 104 from the metal filter net 21 and move them along the axial direction of the metal filter net 21 which is rolled into cylinder, so as to place the inner welding head 103 and the outer welding head 104 to a position corresponding to an un-welded position. Above-said welding procedures are repeated till welding axial parts of the metal filter net 21 which is rolled into cylinder are completely finished.

As shown in FIG. 5, it illustrates the filter sheath 2 formed from the metal filter sheath 21 which is rolled into cylinder. The method of welding the end of filter sheath 2 is as follows: at first, the inner welding head 103 inside the metal filter net 21 which is rolled into cylinder and the outer welding head 104 outside the metal filter net 21 which is rolled into cylinder press against each other, so that each layer of the metal filter net 21 is tightly pressed against each other at the weld points. Supply instant welding current by the inner welding head 103 and the outer welding head 104, parts of each layer of the metal filter net 21 which conduct the welding current are welded in a whole by way of electric arc welding. Further separate the inner welding head 103 and the outer welding head 104 from the metal filter net 21 and rotate along the axial center of the metal filter net 21 which is rolled into cylinder, so as to place the inner welding head 103 and the outer welding head 104 to a position corresponding to next un-welded end position. Above-said welding procedures are repeated till welding the metal filter net 21 which is rolled into cylinder is completely finished along circular outside of its end.

Finally, the filter sheath 2 is welded onto the base pipe 1, and the jacket 3 covers the outside of the filter sheath 2 with filter area of the filter sheath 2 completely covered, and then the jacket 3 and the base pipe 1 are welded together.

It should be understood that the above embodiments are used only to explain, but not to limit the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method for manufacturing a screen, characterized in that said screen comprises a base pipe with multiple penetrated holes on pipe wall, a filter sheath and a jacket with multiple holes; wherein the filter sheath is placed on and covers the outside of the base pipe and the jacket is placed on and covers the outside of the filter sheath, and the welding method comprises the steps:

step 1: wrapping the outside wall of a support sheath with a metal filter net and fixing the metal filter net to the outside of the support sheath by way of resistance welding, such that the metal filter net completely covers all penetrated holes of the support sheath to form the filter sheath;

step 2: fixing said filter sheath to the outside wall of the base pipe and the filter sheath completely covering all penetrated holes of the base pipe;

step 3: putting said jacket round the outside of the filter sheath and fixing it to the outside of the base pipe, such that said jacket completely covers the outside surface of filter potion of the filter sheath;

wherein said step 1 comprises:

step 1a: fixing one end of the metal filter net to the outside wall of the support sheath along axial direction of the support sheath by way of spot welding;

step 1b: wrapping the outside wall of the support sheath with the metal filter to completely cover all penetrated holes on the support sheath;

step 1c: welding the metal filter net which wraps the outside wall of the support sheath to the support sheath along axial direction of the support sheath;

step 1d: welding the ends of the metal filter net which wraps and covers the ends of the outside wall of the support sheath to form the filter sheath;

wherein welding the ends of the metal filter net in step 1d comprises:

providing an inner welding head inside the filter sheath and an outer welding head outside the filter sheath pressing against each other at the same end of the filter sheath, so that the support sheath and the metal filter net are tightly pressed against each other at weld points;

supplying instant welding current by the inner welding head and the outer welding head, the parts of the support sheath and the metal filter net, which conduct the welding current, are welded in a whole at the weld points by way of electric arc welding;

separating the inner welding head and the outer welding head from the filter sheath, and rotating the inner welding head, the outer welding head or the filter sheath around the axis of the filter sheath so as to locate the inner welding head and the outer welding head to next un-welded position;

repeating the above welding procedure till the welding of the metal filter net which covers the support sheath is finished along the circular outside of the end of the support sheath.

2. The method for manufacturing the screen as claimed in claim 1, wherein welding the metal filter net in step 1c comprises:

providing an inner welding head inside the filter sheath and an outer welding head outside the filter sheath pressing against each other, so that the support sheath and the metal filter net are tightly pressed against each other at welding points;

supplying instant welding current by the inner welding head and the outer welding head, so that parts of the support sheath and the metal filter net, which conduct the welding current, are welded in a whole by way of electric arc welding;

separating the inner welding head and the outer welding head from the filter sheath, shifting the inner welding head and the outer welding head or the filter sheath along the axial direction of the filter sheath so as to locate the inner welding head and the outer welding head at next un-welded position of the filter sheath;

repeating the above welding procedure till the welding of the metal filter net which covers the outside wall of the support sheath is finished along the filter sheath's axial direction.

3. The method for manufacturing the screen as claimed in claim 2, wherein said axial shifting uses stepping mode, which means to equidistantly shift the filter sheath with a preset step length so that the inner welding head and the outer welding head are located at a position corresponding to next un-welded position.

4. The method for manufacturing the screen as claimed in claim 3, wherein said stepping mode is to move or rotate along the axis of the filter sheath a preset step length by using a drive mechanism after finishing welding a point.

5. The method for manufacturing the screen as claimed in claim 2, wherein when spot welding the filter sheath, water-cooling is used around the weld points to lower oxidation of welding parts.

6. The method for manufacturing the screen as claimed in claim 2, wherein the size of weld point is 1-10 mm×1-10 mm.

7. The method for manufacturing the screen as claimed in claim 2, wherein when the inner welding head and the outer welding head press against each other, the pressure formed at the weld point ranges from 0.17-170 kgf/mm$^2$.

8. The method for manufacturing the screen as claimed in claim 2, wherein duration of said instant current is no more than 0.3 s.

9. The method for manufacturing the screen as claimed in claim 1, wherein rotating the inner welding head, the outer welding head or the filter sheath around the axis of the filter sheath uses stepping mode, in the stepping mode, when the inner header and/or the outer header is separated from the filter sheath, the filter sheath is rotated an preset step length so that the inner welding head and the outer welding head are located at a position corresponding to next part un-welded.

10. The method for manufacturing the, screen as claimed in claim 9, wherein one or multiple grooves for improving welding strength is opened on the outside of the support sheath's end.

11. The method for manufacturing the screen as claimed in claim 1, wherein welding the ends of the metal filter net in step 1d further comprises: welding the metal filter net which covers the support sheath along circular outside of the end of the support sheath to form a dense welding ring.

12. The method for manufacturing the screen as claimed in claim 1, wherein said filter sheath is fixed to the outside wall of the base pipe by way of welding.

13. The method for manufacturing the screen as claimed in claim 12, wherein fixing the filter sheath to the outside wall of the base pipe includes: welding an end welding ring to the filter sheath's end, and then welding the end welding ring to the outside wall of the base pipe so that said filter sheath and the base pipe are fastened together.

14. The method for manufacturing the screen as claimed in claim 12, further comprising: connecting the metal filter net of the filter sheath with an end welding ring by a hoop, by putting the hoop around the end of the metal filter net, then putting the metal filter net around the outside of the end welding ring and fastening the metal filter net and the end welding ring in a whole by the hoop.

15. A method manufacturing a screen, characterized in that said screen comprises a base pipe with multiple penetrated holes on pipe wall, a filter sheath and a jacket with multiple holes, and the weld methods comprises the steps:

step 1: rolling a metal filter net into cylinder and welding the metal filter net which is rolled into cylinder by way of welding to form the filter sheath;

step 2: fixing the filter sheath to the base pipe such that it completely covers all penetrated holes on the base pipe;

step 3: putting the jacket round the outside of the filter sheath, fixing it to the filter sheath such that the jacket completely covering the outside surfaces of the filter portion of the filter sheath;

wherein said step 1 comprises:

step 1a: welding the metal filter net which is rolled into cylinder from one end along its axial direction by way of spot welding;

step 1b: welding the ends of the metal filter net which is rolled into cylinder to form the filter sheath, wherein welding the ends of the metal filter net includes:
providing an inner welding head placed inside the metal filter net which is rolled into cylinder and an outer welding head outside the metal filter net which is rolled into cylinder pressing against each other at the same end so that each layer of the metal filter net is tightly pressed against each other at weld points;
supplying instant welding current by said inner welding head and outer welding head, each layer of the metal filter net which conduct the welding current is welded in a whole at the weld points;
separating the inner welding head and the outer welding head from the metal filter net which is rolled into cylinder and rotating the inner welding head and the outer welding head or the metal filter net around the axis of the metal filter net which is rolled into cylinder, so as to locate the inner welding head and the outer welding head to a next un-welded position;
repeating the above welding procedure till the welding of metal filter net which is rolled into cylinder along circular outside of the end of the cylinder is finished.

16. The method for manufacturing the screen as claimed in claim 15, wherein welding the metal filter net in step 1a includes:
providing an inner welding head inside the metal filter net which is rolled as cylinder and an outer welding head outside the metal filter net which is rolled into cylinder pressing against each other, so that each layer of the metal filter net is tightly pressed against each other at weld points;
supplying instant welding current by the inner welding head and the outer welding head, parts of each layer of the metal filter net which conduct the welding current are welded in a whole;
separating the inner welding head and the outer welding head from the metal filter net and shifting them along the axial direction of the metal filter net which is rolled as cylinder, so that the inner welding head and the outer welding head are located to a position corresponding to a next un-welded position;
repeating the above welding procedure till welding of the parts along the axial direction of the metal filter net which is rolled as cylinder is finished.

17. The method for manufacturing the screen as claimed in claim 16, wherein said shifting along the axial direction uses stepping mode, in the stepping mode, when the inner welding head and/or the outer welding head are separated from the metal filter net which is rolled into cylinder, the metal filter net which is rolled as cylinder shifts a preset step length so that the inner welding head and the outer welding head are located at a position corresponding to next un-welded position.

18. The method for manufacturing the screen as claimed in claim 16, wherein when spot welding the filter sheath, water-cooling is used around weld points to lower oxidation of welding part.

19. The method for manufacturing the screen as claimed in claim 16, wherein the size of weld point is 1-10 mm×1-10 mm.

20. The method for manufacturing the screen as claimed in claim 16, wherein when the inner welding head and the outer welding head press against each other, the pressure formed at the weld point ranges from 0.17-170 $kgf/mm^2$.

21. The method for manufacturing the screen as claimed in claim 16, wherein duration of said instant current is no more than 0.3 s.

22. The method for manufacturing the screen as claimed in claim 15, wherein rotating the inner welding head and the outer welding head or the metal filter net uses stepping mode, in the stepping mode, when the inner welding head and/or the outer welding head are separated from the metal filter net which is rolled into cylinder, the metal filter net which is rolled into cylinder rotates a preset step length so that the inner welding head and the outer welding head are located to a position corresponding to next un-welded position.

23. The method for manufacturing the screen as claimed in claim 17, wherein said stepping mode is to move or rotate around the axis center of the metal filter net a preset step length by way of a drive mechanism after finishing welding a point.

24. The method for manufacturing the screen as claimed in claim 15, wherein welding the ends of the metal filter net in step 1b further comprises:
welding the metal filter net which is rolled into cylinder to form a dense welding ring along the circular outside of the ends of the cylinder.

25. The method for manufacturing the screen as claimed in claim 15, wherein said jacket is fixed to the outside wall of the filter sheath by way of welding.

26. The method for manufacturing the screen as claimed in claim 15, further comprising: connecting the metal filter net of the filter sheath with an end welding ring by a hoop, by putting the hoop around the end of the metal filter net, then putting the metal filter net around the outside of the end welding ring and fastening the metal filter net and the end welding ring in a whole by the hoop.

* * * * *